US008847954B1

(12) United States Patent
Lin et al.

(10) Patent No.: US 8,847,954 B1
(45) Date of Patent: Sep. 30, 2014

(54) METHODS AND SYSTEMS TO COMPUTE 3D SURFACES

(75) Inventors: Michael Lin, Mountain View, CA (US);
Aleksey Golovinskiy, Mountain View, CA (US)

(73) Assignee: Google Inc., Mountain View, CA (US)

( * ) Notice: Subject to any disclaimer, the term of this patent is extended or adjusted under 35 U.S.C. 154(b) by 255 days.

(21) Appl. No.: 13/311,243

(22) Filed: Dec. 5, 2011

(51) Int. Cl.
*G06T 17/00* (2006.01)

(52) U.S. Cl.
USPC .......................................................... 345/424

(58) Field of Classification Search
USPC .......................................................... 345/424
See application file for complete search history.

(56) References Cited

U.S. PATENT DOCUMENTS

2009/0080798 A1* 3/2009 Maurer et al. ................. 382/275
2009/0110267 A1* 4/2009 Zakhor et al. ................. 382/154

OTHER PUBLICATIONS

Paris, Sylvain, Francois X. Sillion, and Long Quan. "A surface reconstruction method using global graph cut optimization.", 2006, International Journal of Computer Vision 66.2 ,141-161 ,http://link.springer.com/article/10.1007/s11263-005-3953-x#page-1.*
Hornung, Alexander, and Leif Kobbelt. "Robust and efficient photo-consistency estimation for volumetric 3d reconstruction.", 2006 Computer Vision-ECCV 2006. Springer Berlin Heidelberg. 179-190, http://link.springer.com/chapter/10.1007/11744047_14#.*
Gallup, David, Jan-Michael Frahm, and Marc Pollefeys. "A heightmap model for efficient 3d reconstruction from street-level video.", 2010, Int. Conf. on 3D Data Processing, Visualization and Transmission. vol. 6; http://citeseerx.ist.psu.edu/viewdoc/download-?doi=10.1.1.187.6455&rep=rep1&type=pdf.*
Goldluecke, Bastian, and Marcus Magnor, "Space-time isosurface evolution for temporally coherent 3D reconstruction.", Computer Vision and Pattern Recognition, 2004. CVPR 2004. Proceedings of the 2004 IEEE Computer Society Conference on. vol. 1. IEEE, 2004.*
Yang, Ruigang, Marc Pollefeys, and Greg Welch. "Dealing with textureless regions and specular highlights—a progressive space carving scheme using a novel photo-consistency measure." Computer Vision, IEEE International Conference on. vol. 1. IEEE Computer Society, 2003.*

* cited by examiner

*Primary Examiner* — Ke Xiao
*Assistant Examiner* — Sarah Le
(74) *Attorney, Agent, or Firm* — Dority & Manning, P.A.

(57) ABSTRACT

Systems, methods and computer apparatuses for computing three dimensional (3D) surfaces are described herein. An embodiment includes constructing a slanted voxel grid oriented in a direction between at least two camera locations, projecting images from respective camera locations onto the constructed voxel grid, calculating, for one or more voxels in the voxel grid, a magnitude of difference between pixels corresponding to respective projected images to provide a difference value for each of the one or more voxels, and computing a three dimensional surface passing through voxel locations corresponding to one or more calculated difference values of the one or more voxels. In an embodiment, the three dimensional surface is computed as a surface passing through voxel locations corresponding to calculated difference values having lower magnitudes with respect to other calculated difference values.

20 Claims, 26 Drawing Sheets

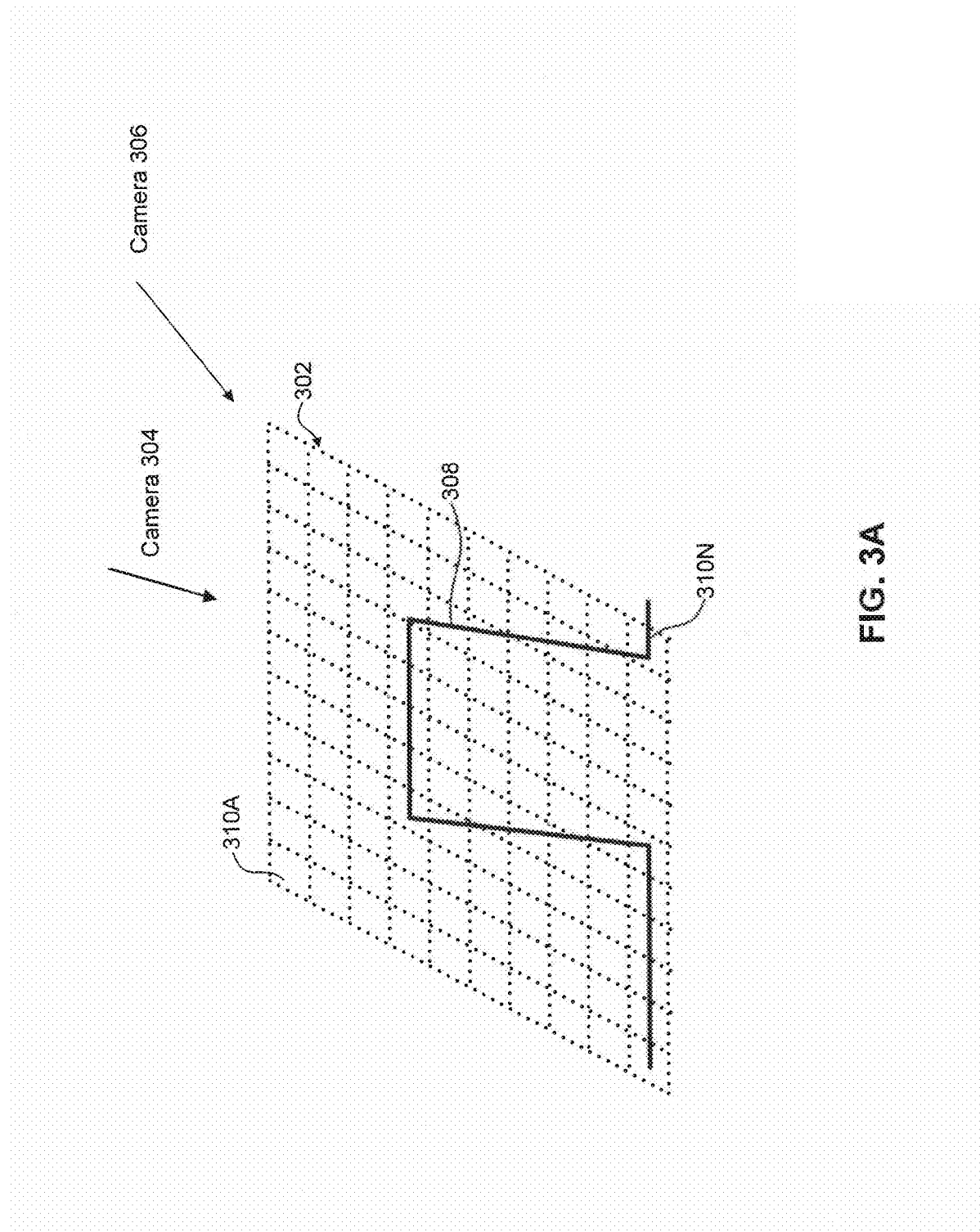

702

METHODS AND SYSTEMS TO COMPUTE 3D SURFACES

BACKGROUND

1. Field

Embodiments generally relate to digital imagery and three dimensional (3D) surfaces.

2. Background Discussion

Stereo, or the determination of 3D structure from multiple two dimensional (2D) images of a scene, is one of the fundamental problems of computer vision. Although steady progress has been made in recent algorithms, conventional stereo techniques generate undesirable artifacts in 3D surfaces and structures reconstructed from oblique (or non-nadir) imagery, i.e., imagery that is captured from a viewpoint that not only points downwards but is also inclined to a side.

BRIEF SUMMARY

Embodiments relate to computing 3D surfaces. An embodiment includes constructing a slanted voxel grid oriented in a direction between at least two camera locations, projecting images from respective camera locations onto the constructed voxel grid, calculating, for one or more voxels in the voxel grid, a magnitude of difference between pixels corresponding to respective projected images to provide a difference value for each of the one or more voxels, and computing a three dimensional surface passing through voxel locations corresponding to one or more calculated difference values of the one or more voxels. In an embodiment, the three dimensional surface is computed as a surface passing through voxel locations corresponding to calculated difference values having lower magnitudes with respect to other calculated difference values.

Further embodiments, features, and advantages of the embodiments, as well as the structure and operation of the various embodiments are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

FIG. 3A illustrates an example slanted voxel grid cross-section of the slanted voxel grid of FIG. 2C, according to an embodiment.

DETAILED DESCRIPTION

Embodiments relate to computing 3D surfaces. An embodiment includes constructing a slanted voxel grid oriented in a direction between at least two camera locations (e.g., a direction towards the center of at least two camera locations) and projecting images from respective camera locations onto the constructed voxel grid. As an example, the projected images can be oblique aerial images, including one or more structures (e.g., buildings), captured from marginally different viewpoints.

The embodiment proceeds by calculating, for one or more voxels in the voxel grid, a magnitude of difference between pixels corresponding to respective projected images to provide a difference value for each of the one or more voxels.

A three dimensional surface is computed that passes through voxel locations corresponding to one or more calculated difference values of the one or more voxels. In one embodiment, the one or more difference values used to compute the 3D surface have lower magnitudes (or lower photo-consistency errors) with respect to other computed difference values.

Figure 7A:
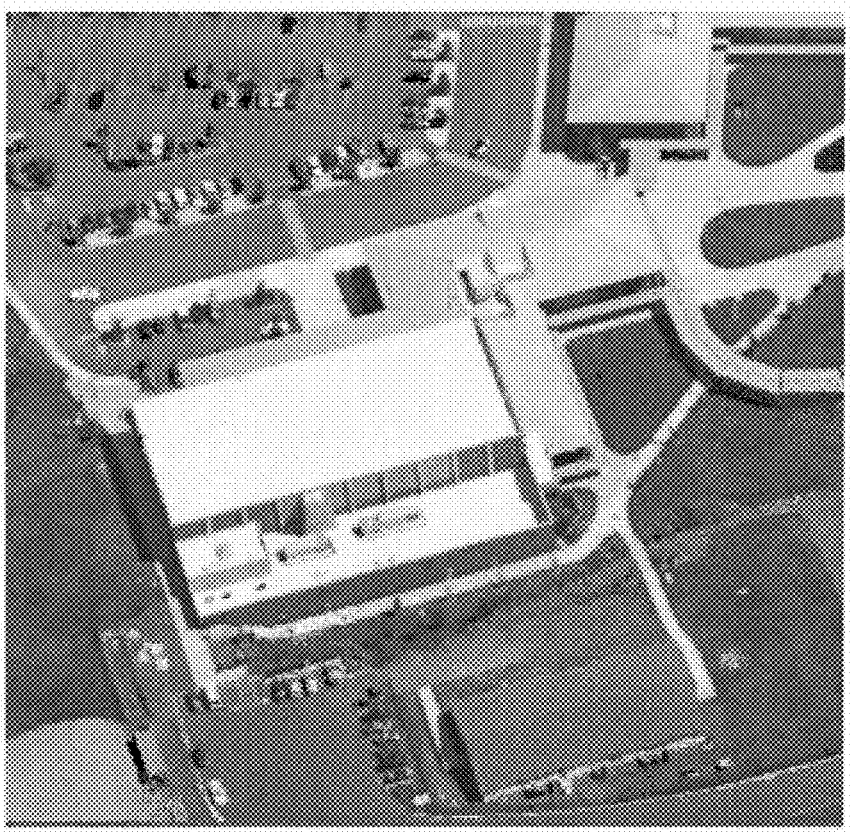
FIGS. 7A and 7B are example oblique aerial images, each captured from slightly different viewpoints that not only point downwards, but are also inclined to a side.
Figure 7B:

In this way, by using a slanted voxel grid for projection of imagery, embodiments accurately reconstruct smooth 3D surfaces representing structures (e.g., buildings) from oblique (or slanted) aerial imagery, i.e., imagery that is captured from a viewpoint that not only points downwards but is also inclined to a side (e.g., oblique images of FIGS. 7A and 7B).

While the present embodiments are described herein with reference to illustrative applications, it should be understood that the embodiments are not limited thereto. Those skilled in the art with access to the teachings provided herein will recognize additional modifications, applications, and embodiments within the scope thereof and additional fields in which the embodiments would be of significant utility.

Figure 1:
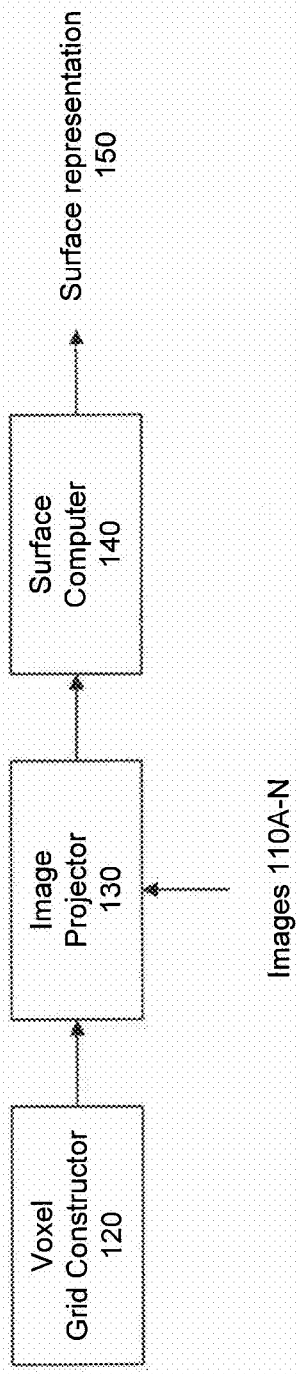
FIG. 1 illustrates a system for computing 3D surfaces, according to an embodiment.

FIG. 1 is a diagram of system 100 for computing 3D surfaces, according to an embodiment. While the following is described in terms of aerial and oblique imagery, the embodiments are not limited to such imagery and the techniques described herein and can be applied to any other form of imagery and data, including, but not limited to, non-aerial imagery, imagery captured from any orientation/direction, oceanic imagery, geographic and terrain imagery, astronomical imagery, extraterrestrial imagery, or any combination thereof. The embodiments are applicable to any system having generally the structure of FIG. 1, or that would benefit from the operation, methods and functions as described herein.

System 100 includes voxel grid constructor 120, image projector 130 and surface computer 140.

In an embodiment, voxel grid constructor 120 is configured to construct a slanted voxel grid oriented in a direction between at least two camera locations. In an embodiment, image projector 130 is configured to project images 110A-N (e.g., oblique aerial images) from respective camera locations onto the constructed voxel grid.

In an embodiment, surface computer 140 is configured to calculate, for one or more voxels in the voxel grid, a magnitude of difference between pixels corresponding to respective projected images 110A-N to provide a difference value for each of the one or more voxels, and compute a three dimensional surface passing through voxel locations corresponding to one or more calculated difference values of the one or more voxels. It is to be appreciated that calculation of a difference value is not limited to a magnitude of difference between pixel values, and the difference value may be computed by any other technique known to those skilled in the art.

In an embodiment, surface computer 140 computes the three dimensional surface as a surface passing through voxel locations corresponding to calculated difference values having lower magnitudes with respect to other calculated difference values.

In this way, by using a slanted voxel grid for projection of imagery, embodiments accurately reconstruct smooth 3D surfaces representing structures (e.g., buildings) from oblique imagery, i.e., imagery that is captured from a viewpoint that not only points downwards but is also inclined to a side (e.g., oblique images of FIGS. 7A and 7B).

In an embodiment, voxel grid constructor 120, image projector 130 and surface computer 140 can each be any type of processing (or computing) device having one or more processors and memory for storage. For example, voxel grid constructor 120, image projector 130 and surface computer 140 can each be implemented as a workstation, mobile device (such as a mobile phone tablet or laptop), computer, cluster of computers, set-top box, embedded system, console, or other device having at least one processor. Such a processing device may include software, firmware, hardware, or a combination thereof. Software may include one or more applications and an operating system. Hardware can include, but is not limited to, a processor, memory and graphical user interface display. Voxel grid constructor 120, image projector 130 and surface computer 140 may also be implemented in a cloud or distributed computing infrastructure, at a client or server or any combination thereof. The operation of voxel grid constructor 120, image projector 130 and surface computer 140 is described further below.

In stereo approaches, 3D space may be parameterized as (x,y,d), where (x,y) are image coordinates for a "base camera," and (d) is disparity or inverse scene depth.

As a non-limiting example, the base camera can coincide with a real-world "inspection camera" that provides at least one of input images, or it can be a separate virtual camera. Generally, a specification of the base camera determines a mapping between physical (or real-world) space and the (x,y,d) parameter space in which computations can be performed.

Conventional stereo approaches rely on a notion that 3D space parameterization should correspond to a real or virtual camera. In contrast to conventional approaches, embodiments enable parameterization (e.g., (x,y,d) parameterization) of 3D space to be defined arbitrarily as will be discussed below with reference to FIGS. 2A, 2B and 2C.

Figure 2A:
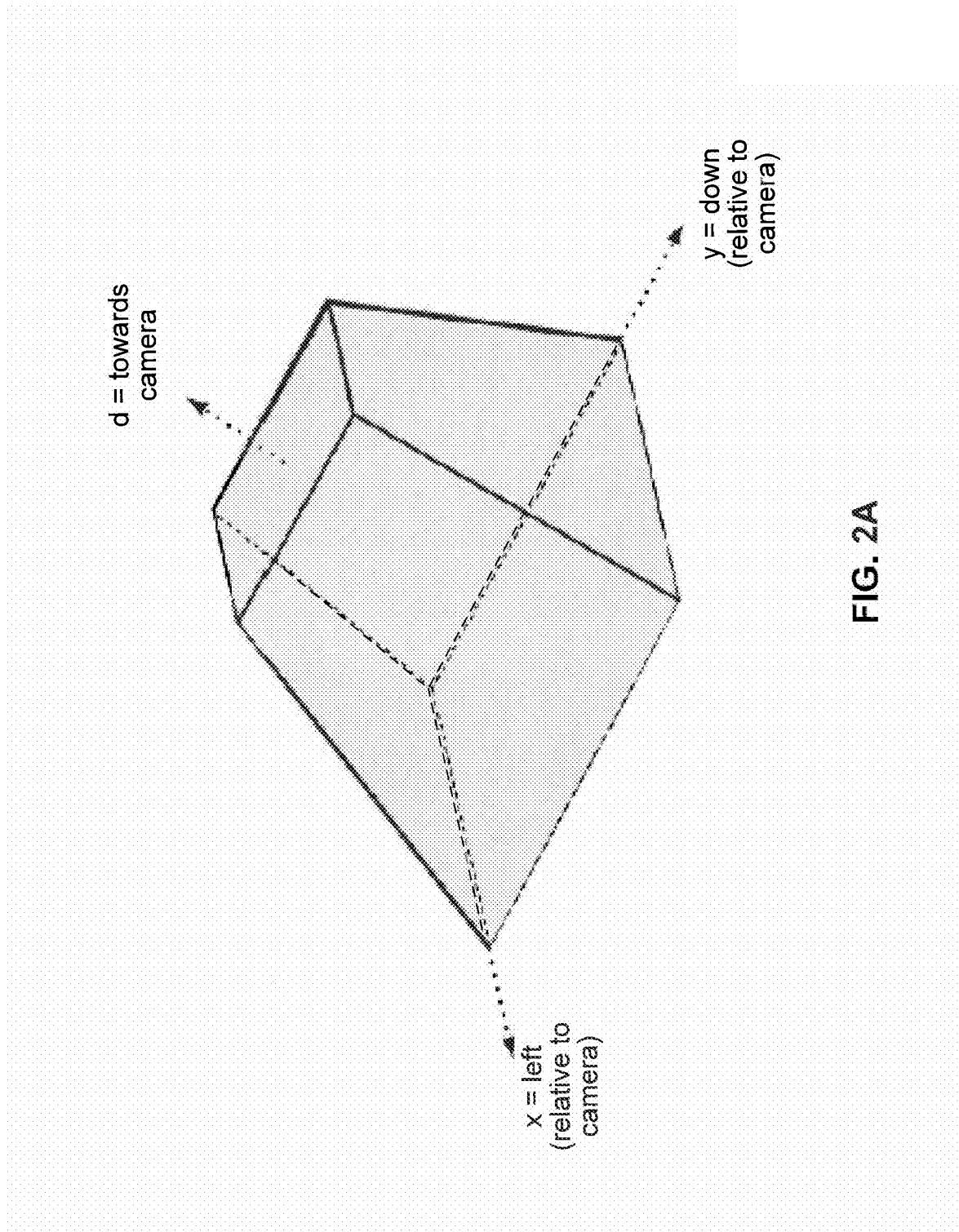
FIG. 2A illustrates an example conventional parameterization for wide-angle cameras.
Figure 2B:
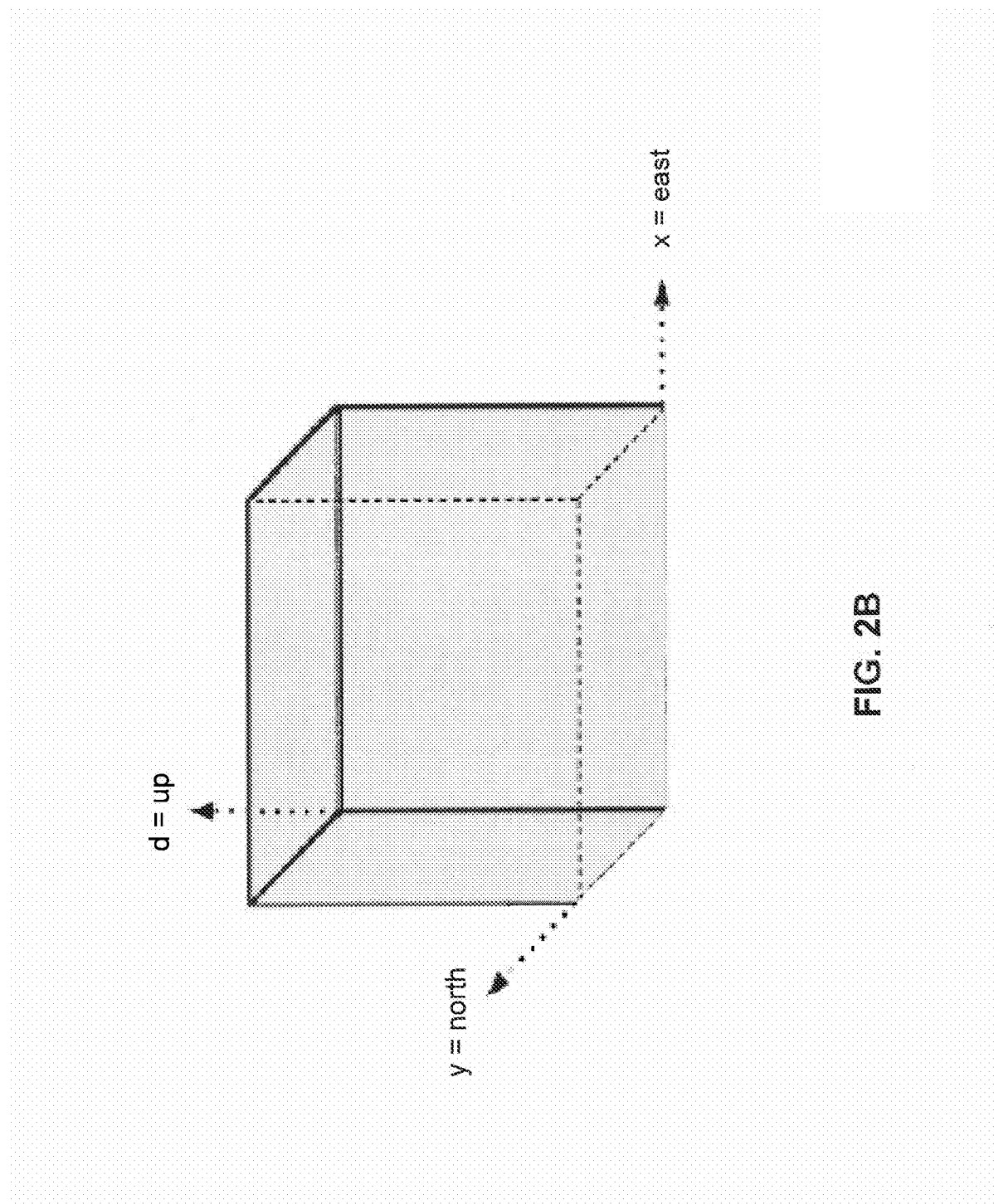
FIG. 2B illustrates an example conventional parameterization for high-altitude, downward-looking cameras.

In FIGS. 2A and 2B, 3D space parameterization corresponds to a real or virtual camera. FIG. 2A illustrates a conventional parameterization for wide-angle cameras (e.g., cameras for vision-based obstacle detection for mobile robots or automated cars) that correspond to a virtual but otherwise identical camera placed between the two real-world cameras (e.g., two aerial oblique looking cameras). FIG. 2B illustrates a conventional parameterization for high-altitude, downward-looking cameras (e.g., cameras for classical photogrammetry) that corresponds to an ideal orthographic camera.

As noted above and in contrast to conventional approaches, embodiments enable parameterization (e.g., (x,y,d) parameterization) of 3D space to be defined arbitrarily by constructing a slanted voxel grid.

Figure 2C:
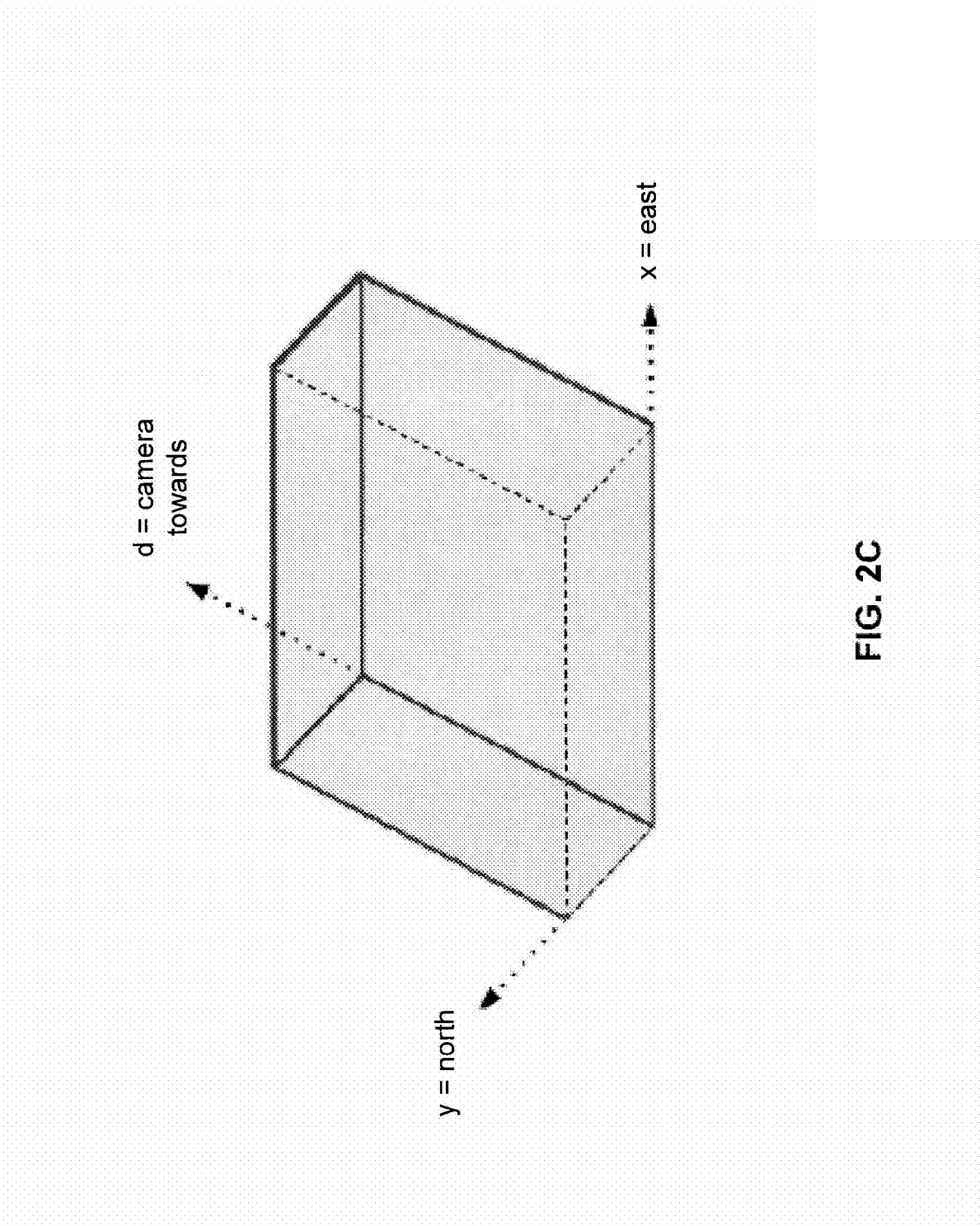
FIG. 2C illustrates an example parameterization for oblique-looking cameras using a slanted voxel grid, according to an embodiment.

FIG. 2C illustrates an example parameterization for oblique-looking cameras (e.g., mid-altitude oblique looking cameras) using a slanted voxel grid, according to an embodiment. As will be discussed below, by using a slanted voxel grid for projection of imagery, embodiments accurately construct smooth 3D surfaces representing structures (e.g., buildings) from oblique aerial imagery (e.g., images of FIGS. 7A and 7B). Embodiments can also be used to ortho-rectify (or geometrically correct) oblique aerial imagery for 2D mapping and 3D terrain viewing applications.

FIG. 3A illustrates an example slanted voxel grid cross-section 302 (hereinafter "voxel grid 302") of the slanted voxel grid of FIG. 2C, according to an embodiment. Voxel grid 302 also illustrates a plurality of voxel cross-sections 310A-N (hereinafter "voxels 310A-N"). FIG. 3A can be considered to represent a 2D cross-section of a 3D world and is used for the purposes of discussion and not limitation. Although the following is discussed with reference to cross-sectional FIG. 3A, it is to be appreciated that embodiments are not limited to operating on 2D cross-sections, but operate in 3D space (e.g., voxel grid of FIG. 2C).

FIG. 3A also illustrates two cameras, namely camera 304 and camera 306 that are oriented to capture oblique aerial imagery. In an embodiment, cameras 304 and 306 are oriented in such a manner that the cameras capture imagery from marginally different viewpoints. For example, FIG. 7A illustrates an image captured by camera 304 and FIG. 7B illustrates an image captured by camera 306.

In an embodiment, slanted voxel grid 302 is constructed by voxel grid constructor 120 and is oriented in a direction between locations of camera 304 and camera 306.

In an embodiment, image projector 130 is configured to project images, captured from cameras 304 and 306, onto the constructed voxel grid 302. Because cameras 304 and 306 can be oriented at slightly (or marginally) different viewpoints, image projector 130 can project one or more images, captured from different viewpoints, onto voxel grid 302. In another non-limiting embodiment, image projector 130 may project one or more images, which may be captured from any respective viewpoint(s), onto voxel grid 302.

Referring to FIG. 3A, surface 308 represents surface geometry of a 3D structure (e.g., building on the ground) that appears in respective images captured by camera 304 or 306 that are projected onto slanted voxel grid 302 by image projector 130. Surface 308 appearing in the projected images is approximated (or reconstructed into 3D space) by surface computer 140, according to an embodiment.

Figure 4:
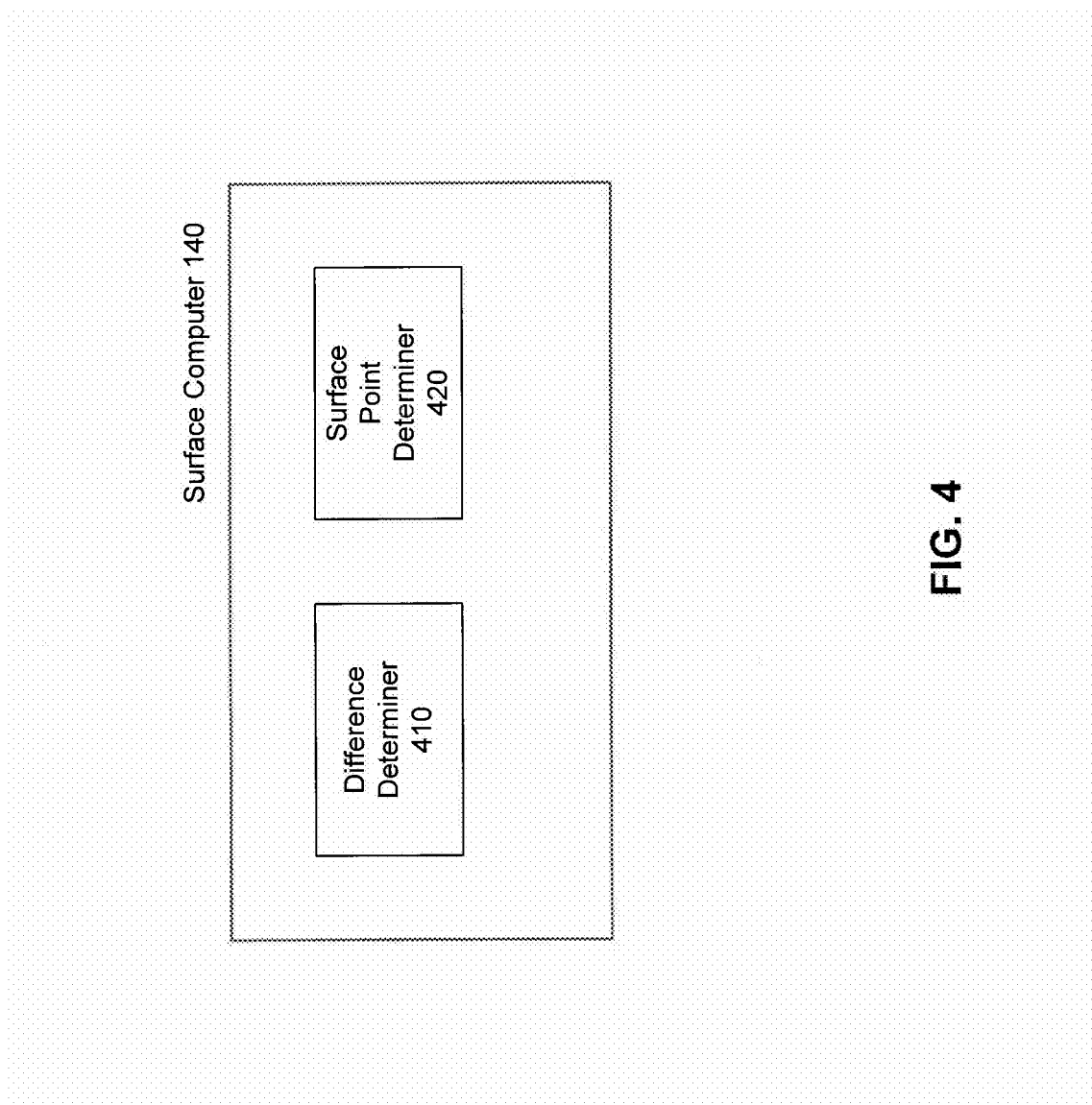
FIG. 4 illustrates a diagram of a surface computer, according to an embodiment.

FIG. 4 illustrates a diagram of surface computer 140, according to an embodiment. In an embodiment, surface computer 140 is configured to construct smooth 3D surfaces representing structures (e.g., buildings) from oblique aerial imagery.

As shown in FIG. 4, surface computer includes difference determiner 410 and surface point determiner 420.

In an embodiment, difference determiner 410 is configured to calculate, for one or more voxels 310A-N in voxel grid 302, a magnitude of difference between pixels corresponding to respective projected images to provide a difference value for each of the one or more voxels 310A-N. In a non-limiting embodiment, the difference values are computed by difference determiner 410 at a center of each respective voxel 310A-N in voxel grid 302.

Figure 3B:
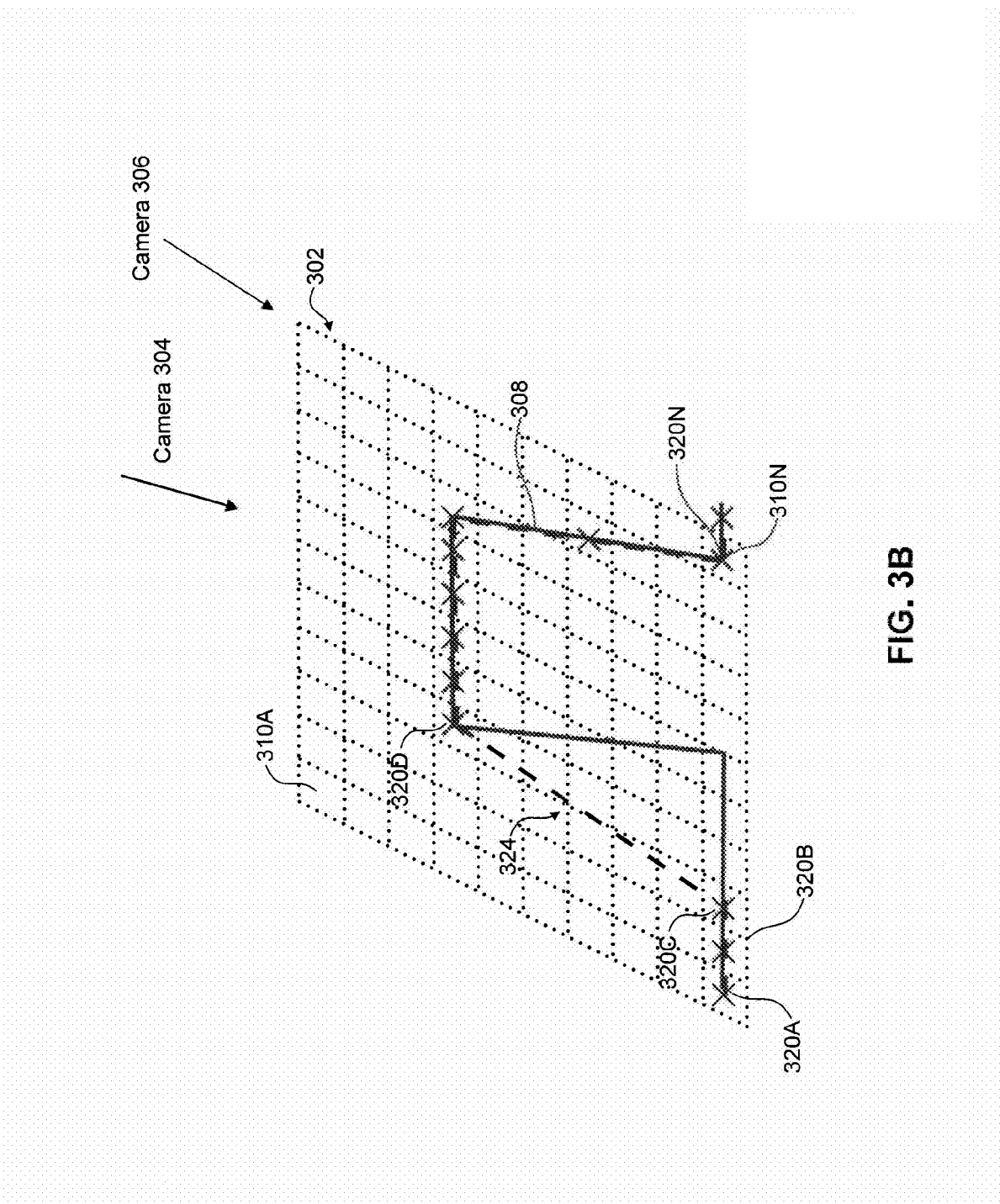
FIG. 3B illustrates voxel centers of voxels (of FIG. 3A) at which difference values are calculated, according to an embodiment.

Referring to FIG. 3B, points 320A-N represent voxel centers of voxels 310A-N at which difference values are calculated by difference determiner 410. It is to be appreciated that difference determiner 410 is not limited to calculating difference values at centers of voxels 310A-N and may compute difference values at any other location(s) within voxels 310A-N.

In an embodiment, the one or more difference values calculated by difference determiner 410 are used by surface point determiner 420 to compute points corresponding to a three dimensional surface passing through voxel locations corresponding to the difference values.

Referring to FIG. 3B, points 320A-N may represent voxel locations corresponding to difference values having lower magnitudes with respect to other computed difference values. Because these difference values having lower magnitudes (or lower photo-consistency errors) with respect to other computed difference values, surface computer 140 determines that the points correspond to surface 308 of a 3D structure. In this way, by interpolating points representing voxel locations corresponding to lower difference values, surface computer can compute surface 324 as an approximation of surface 308.

In an embodiment, surface point determiner 420 computes points 320A-N that correspond to a three dimensional surface using a minimum-cut ("min-cut") algorithm. In an embodiment, the min-cut algorithm is configured to approximate a smooth surface passing through points 320A-N.

As an example, the center (i, j, k) of each voxel 310A-N corresponds to a 3D world position W(i, j, k). As an example, referring to FIGS. 2C, 3A and 3B, consider i, j and k to respectively index x/East, y/North, z/Up directions. In other words, i indexes to the right of a display screen, j indexes into the display screen, and k indexes up on the display screen.

In an embodiment, to compute "photo-consistency" between two images captured by cameras 304 and 306 at world position W(i, j, k), embodiments estimate the similarity of parts of the images that seen (or are located at) world position W(i, j, k).

In an embodiment, the 3D world position W(i, j, k) is projected to the two images captured by cameras 304 and 306 by projections $P^1$ and $P^2$ to pixels $p^1$ i, j, k and $p^2$ i, j, k, respectively, where $p^1$ i, j, k and $p^2$ i, j, k are 2D image coordinates for the two images.

In an embodiment, the photo-consistency can be estimated by calculating a difference in value of the two pixels, i.e., pixels $p^1$ i, j, k and $p^2$ i, j, k, or the difference of the image in the neighborhood of the two pixels, or even a normalized cross correlation of the neighborhood of the two pixels. Normalized cross correlation is known to those skilled in the art and is a method used for template matching, a process used for finding incidences of a pattern or object within an image.

In an embodiment, difference determiner 410 determines a magnitude of the gradients of two images captured by cameras 304 and 306, and calculates a difference between the determined magnitudes.

In an embodiment, if $G^i$ is a function that generates a gradient magnitude of image i, the photo-consistency error at a voxel center (i, j, k) can be represented as:

$$E_{pv}(i,j,k) = |G^1(P^1(W(i,j,k))) - G^2(P^2(W(i,j,k)))| \quad (1)$$

In equation (1), $E_{pv}$(i, j, k) represents an absolute value of difference in gradients between the images at the projected pixel locations $p^1$ i, j, k and $p^2$ i, j, k. The "pv" in the subscript of $E_{pv}$(i, j, k) indicates that $E_{pv}$(i, j, k) represents a per-voxel error measure.

In an embodiment, surface computer 140 generates a 3D surface that is a height-map relative to voxel grid 302. In other words, and according to a non-limiting embodiment, surface computer 140 generates a 3D surface that passes once through each column of voxel grid 302 that is indexed by (i, j). The surface can then be described as a function S(i, j), and provides a value of the third index (k) for a given column.

In an embodiment, surface computer 140 generates a 3D surface that has low photo-consistency errors at surface points 320A-N.

In an embodiment, surface computer 140 generates a smooth surface where a value of S(i, j) does not significantly deviate from another neighboring values of S(i, j).

In particular, and according to an embodiment, surface computer 140 computes a surface in a manner that minimizes smoothness function $E_s$(S), where:

$$E_s(S) = \sum_{NeighborColumns(i,j),(k,l)} |S(i, j) - S(k - l)| \quad (2)$$

In an embodiment, $E_s$(S) is a summation over all neighboring columns of voxel grid 302, where the summation computes an absolute value of height differences representing a 3D surface that is a height-map relative to voxel grid 302.

In an embodiment, encouraging a smaller Es(S) is equivalent to encouraging generation of a flat, horizontal surface. Such a flat, horizontal surface is referred to as a "prior." In the absence of other surface and heuristic information, surface computer 140 utilizes such a horizontal surface as a prior to compute surfaces constructed from aerial imagery. Because a flat, horizontal surface is utilized as a prior, a slanted voxel constructed in accordance with the embodiments enables generation of smoother and accurate surfaces compared to a conventional voxel grid.

In an embodiment, a photo-consistency error function $E_p$(S) for a given surface can be expressed as:

$$E_p(S) = \sum_{Columns(i,j)} E_{pv}(i, j, S(i, j)) \quad (3)$$

$E_p$(S) represents a sum over all voxels in the surface of the per-voxel error, $E_{pv}$(i,j,k), discussed above.

In order to determine a surface that satisfies considerations associated with equations (1), (2) and (3), surface computer 140 computes a surface S that minimizes E(S), where:

$$E(S) = E_p(S) + E_s(S) \quad (4)$$

In an embodiment, to find a surface that minimizes E(S), surface computer 140 applies a min-cut algorithm to a graph constructed based on voxel grid 302.

Figure 5A:
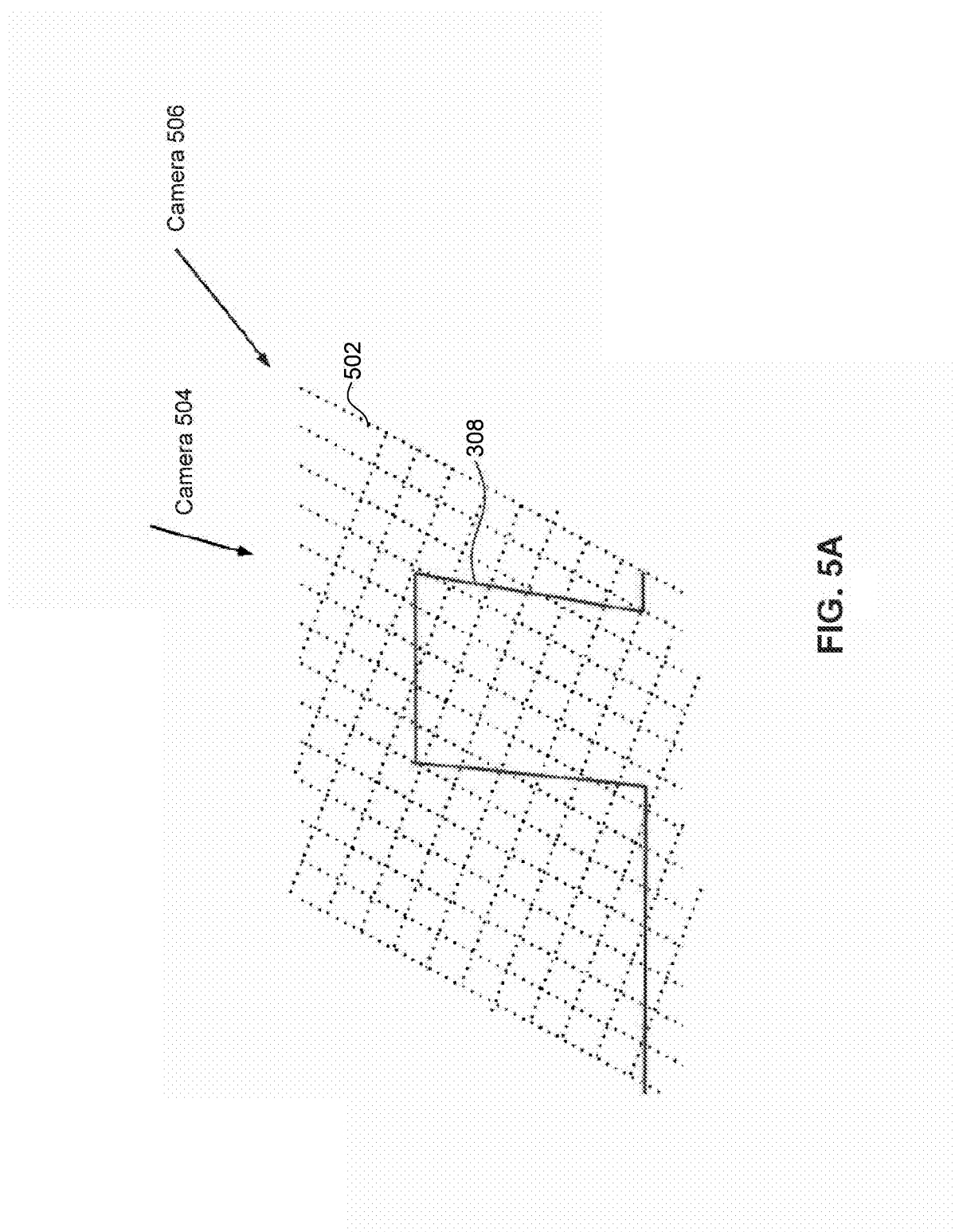
FIG. 5A illustrates use of a conventional camera-aligned voxel grid (e.g., the voxel grid of FIG. 2A) to compute a surface.

FIG. 5A illustrates use of a conventional camera-aligned voxel grid 502 (e.g., the voxel grid of FIG. 2A) to compute surface 308. As shown in FIG. 5A, camera-aligned voxel grid 502, unlike slanted voxel grid 302, has voxel edges parallel to the plane of images captured by cameras 504 and 506. In other words, the voxel edges are not parallel to voxel grid 502.

Figure 5B:
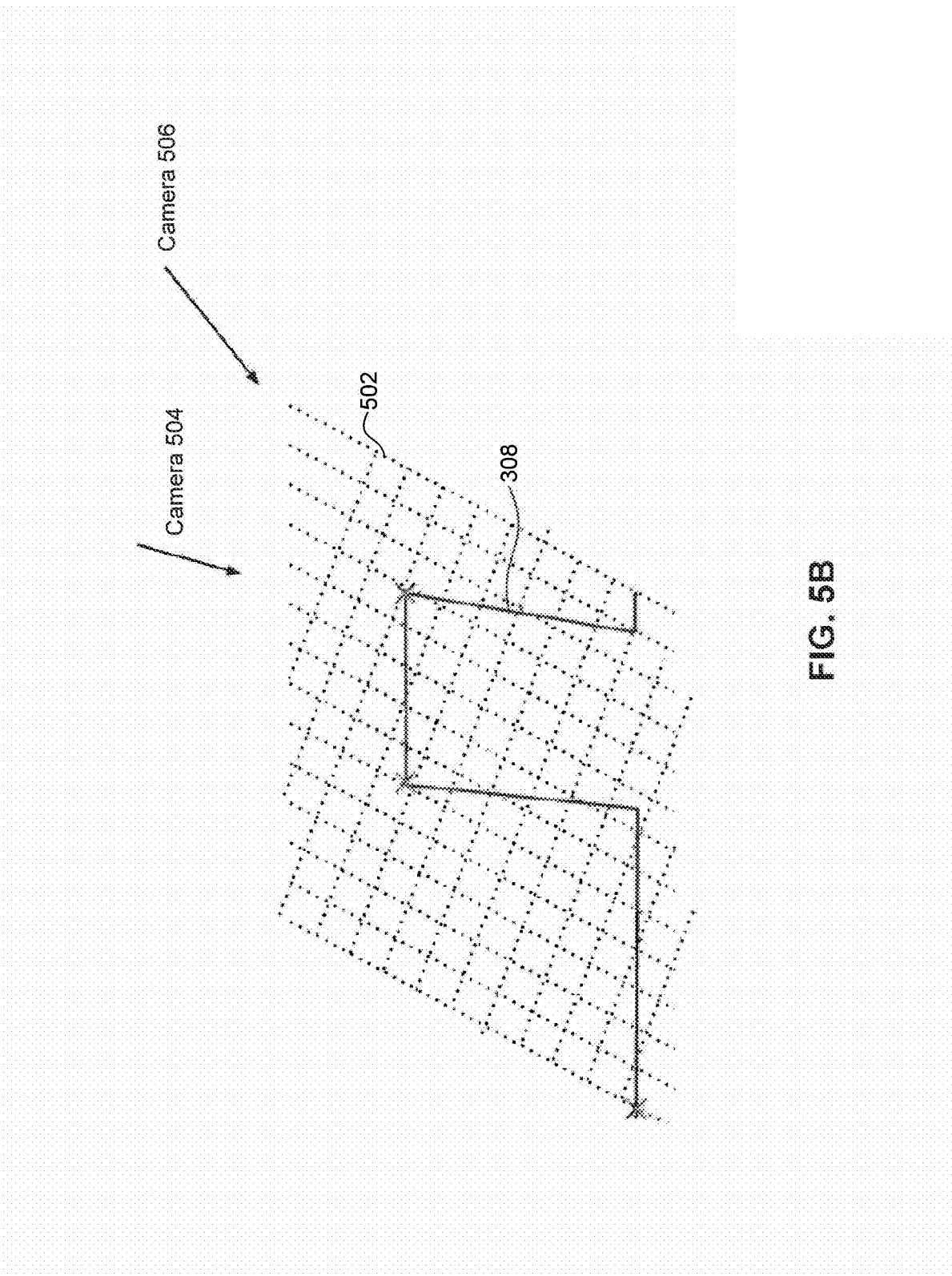
FIG. 5B illustrates photo-consistency signals on the conventional camera-aligned voxel grid of FIG. 5A.

As an example real-world setting, not every column of voxels in voxel grid 502 will receive a strong photo-consistency cue (or pixel difference value) representing the height of surface 308 in a voxel column. Instead, there will be a few "strong" or significant signals from photo-consistency, marked with X's as illustrated in FIG. 5B.

In an embodiment, smoothness error, E(S), can have a significant effect on determining location of surface 308. The smoothness error encourages the surface to follow consistent altitudes in the voxel spaces (represented by diagonal voxel lines in FIG. 5A). Thus, use of a conventional camera-aligned voxel grid 502 can result in computed surface 510 illustrated in FIG. 5C.

As noted above, encouraging a smaller Es(S) is equivalent to encouraging generation of a flat, horizontal surface. Such a flat, horizontal surface is referred to as a "prior." In the absence of other surface and heuristic information, surface computer 140 utilizes such a horizontal surface as a prior to compute surfaces constructed from aerial imagery.

Figure 5C:
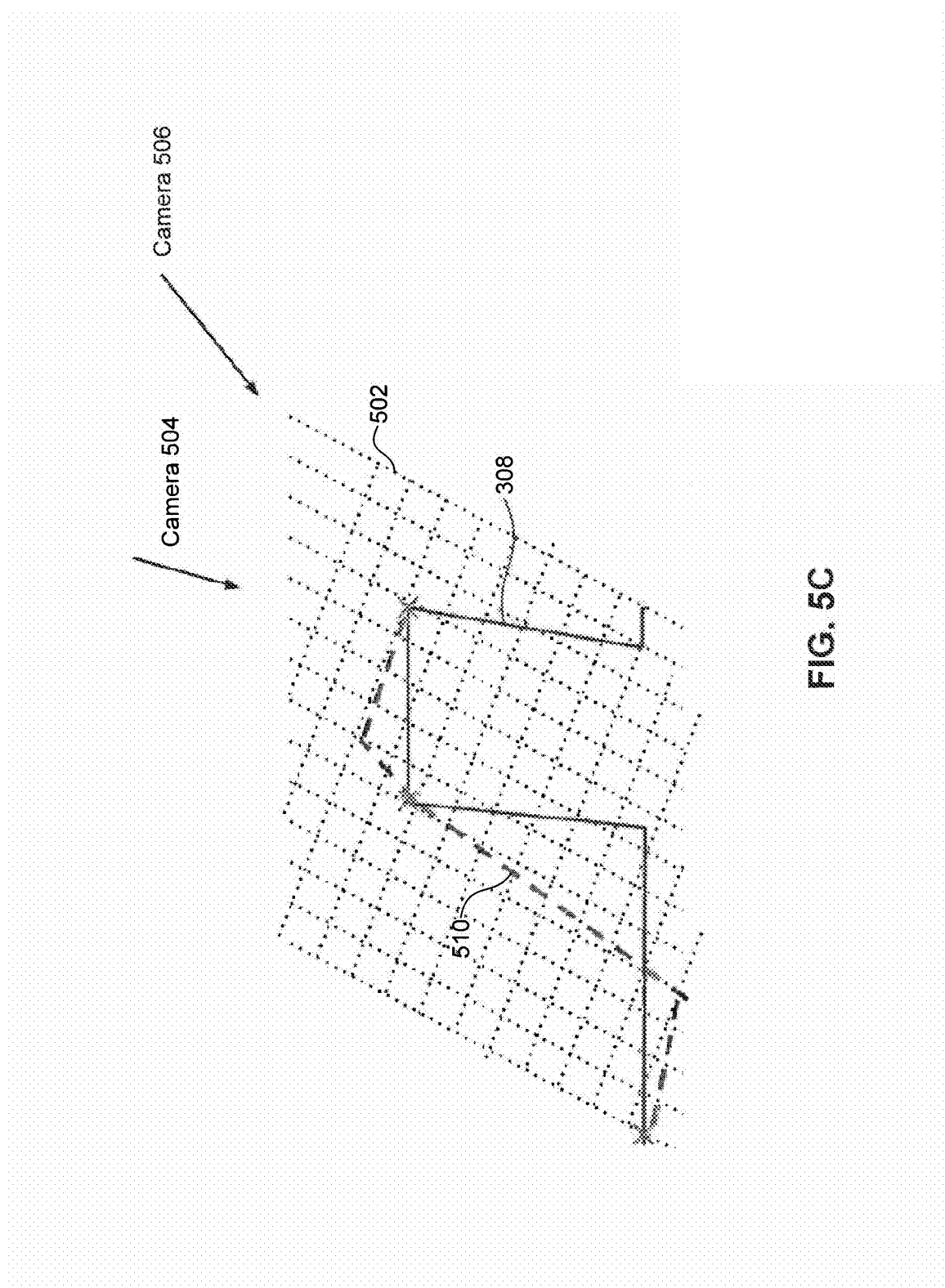
FIG. 5C illustrates a surface computed using the conventional camera-aligned voxel grid of FIG. 5A and photo-consistency signals of FIG. 5B.

Referring to FIG. 5C, the prior, enforced by smoothness function E(S), forces computed surface 510 parallel to the image plane. On the other hand, with the slanted voxel grid 302, because voxel lines are parallel to the ground, the prior forces computed surface 308 to be horizontal, an orientation that is more useful for computing surfaces appearing in aerial imagery.

Figure 5D:
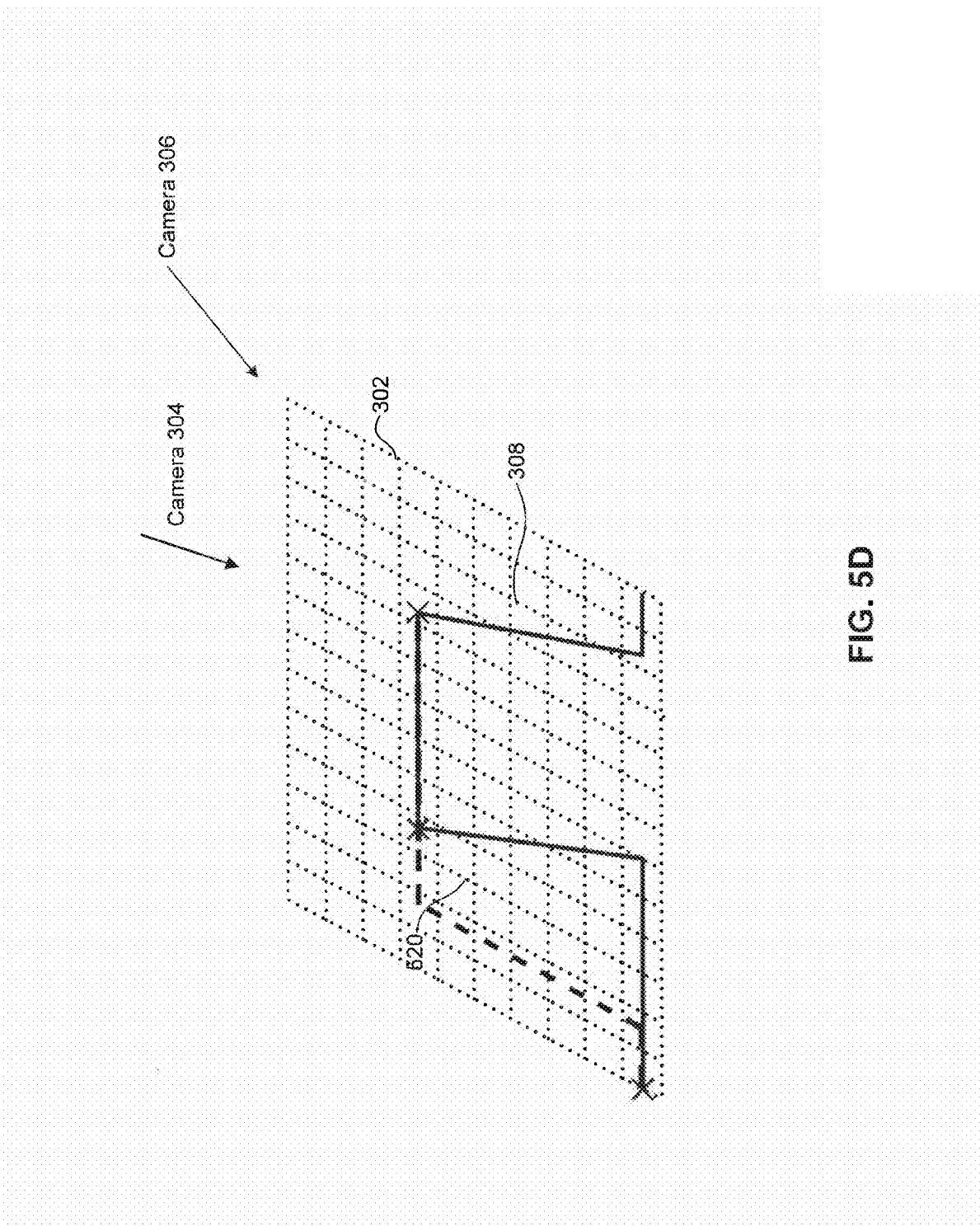
FIG. 5D illustrates an example surface computed using a slanted voxel grid, according to an embodiment.

FIG. 5D illustrates a surface 520 computed using slanted voxel grid 302, according to an embodiment. Because many more surfaces captured in aerial images are horizontal to the ground rather than to an image plane, the computed 3D surface is more accurate.

Figure 6A:
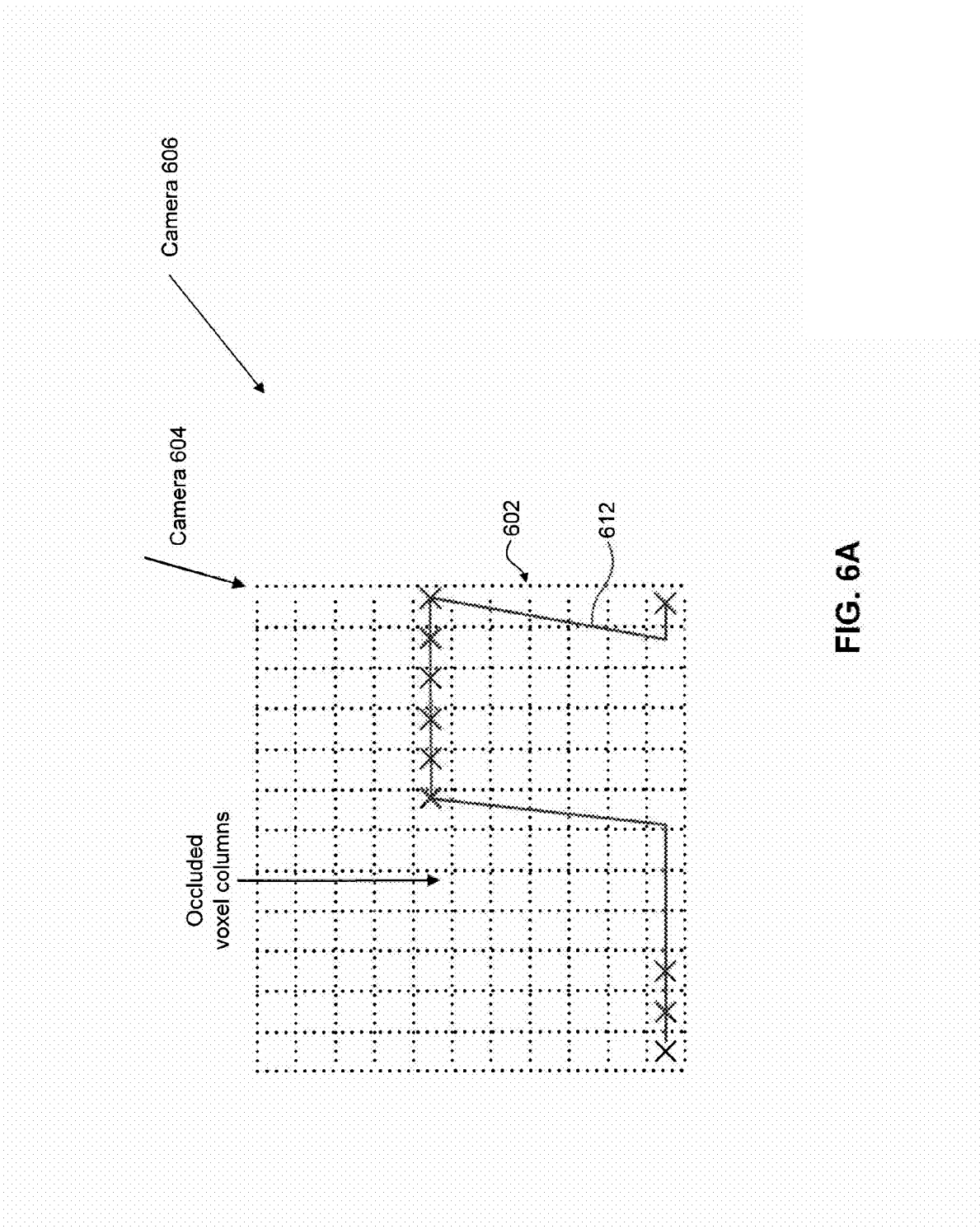
FIG. 6A illustrates a conventional world-aligned grid (e.g., the voxel grid of FIG. 2B) having voxel lines parallel to the ground.

FIG. 6A illustrates a conventional world-aligned grid (e.g., the voxel grid of FIG. 2B) having voxel lines parallel to the ground. Because voxel lines are parallel to the ground, the prior forces computed surface 608 to be horizontal (or parallel to the ground), an orientation that is more useful for computing surfaces appearing in aerial imagery. While the prior of voxel grid 602 can be considered to be useful for the purpose of computing horizontally oriented surfaces (e.g., surface 612), conventional voxel grid 602 suffers from another issue that affects accurate surface computation.

Figure 6B:
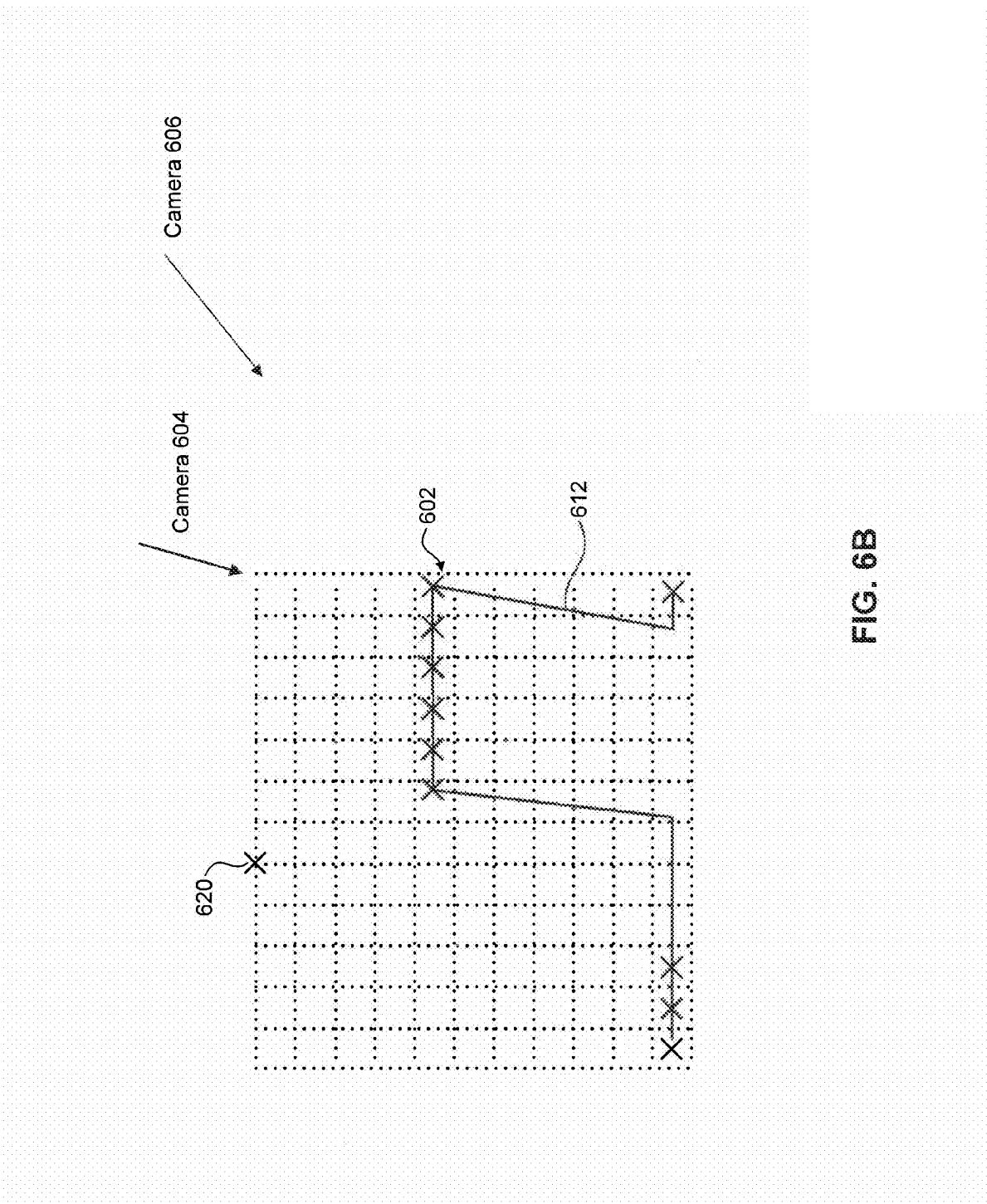
FIG. 6B illustrates photo-consistency signals on the conventional world-aligned voxel grid of FIG. 6A.

Referring to the cross-section of a conventional world-aligned voxel grid illustrated in FIG. 6A, note that because of the orientation of cameras 604 and 606, there are voxel columns (i.e., to the left of the building) in which cameras 604 and 606 do not 'see' the surface. In other words, surfaces to the left of the building are occluded to cameras 604 and 606. Because certain voxel columns are occluded from cameras 604 and 606, there may not be height in these voxel columns where the visible surface causes photo-consistency error to be low. The lowest photo-consistency 620 may be in an arbitrary height as shown in FIG. 6B. It is to be appreciated that such occlusion does not occur for slanted grid of FIG. 2C.

Figure 6C:
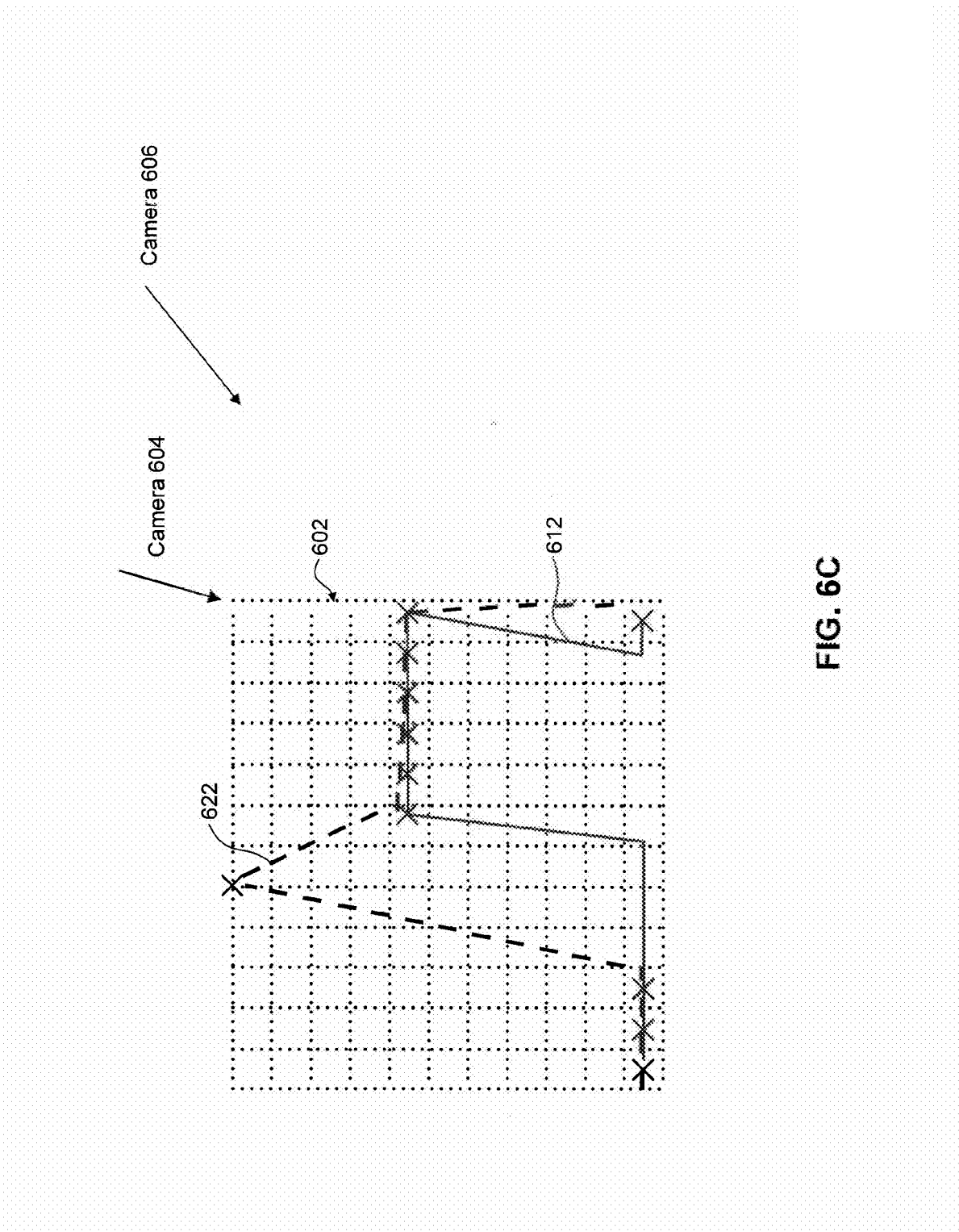
FIG. 6C illustrates a surface computed using the conventional world-aligned voxel grid of FIG. 6A and photo-consistency signals of FIG. 6B.

Surface 622 computed using the conventional world-aligned grid of FIG. 6A is illustrated in FIG. 6C. Referring to FIG. 6C, because of the occlusion noted above, the photo-consistency assumption is incorrect, and the features of the image lead to incorrectly computed surface 620.

FIGS. 7A and 7B are example oblique aerial images, 702 and 704, each captured from slightly different viewpoints that not only point downwards but also inclined to a side.

Figure 8A:
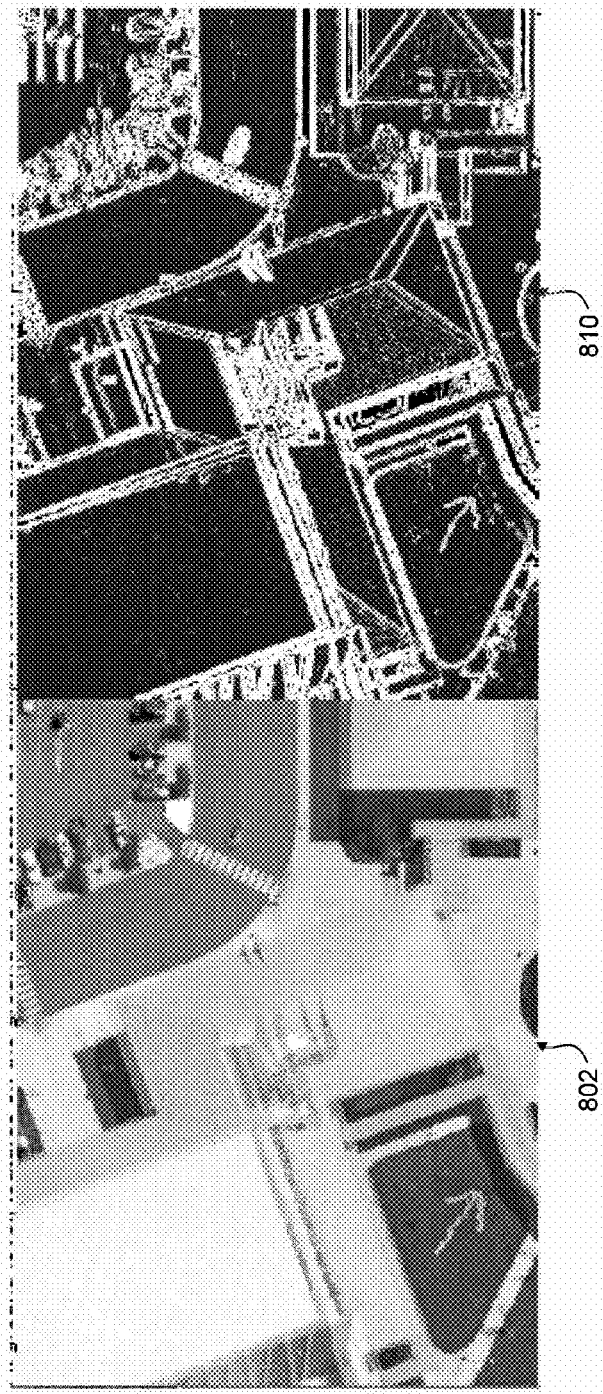
FIGS. 8A-8C illustrate example projections of images to horizontal slices of a slanted voxel grid, according to an embodiment.
Figure 8B:
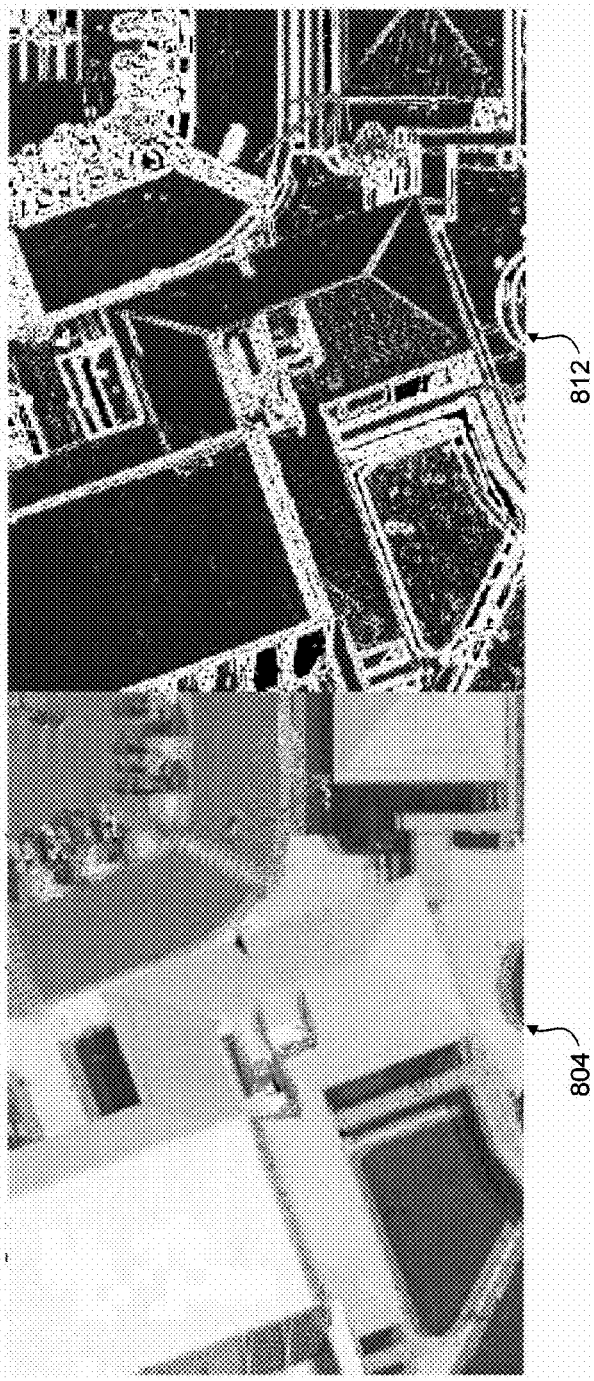
Figure 8C:
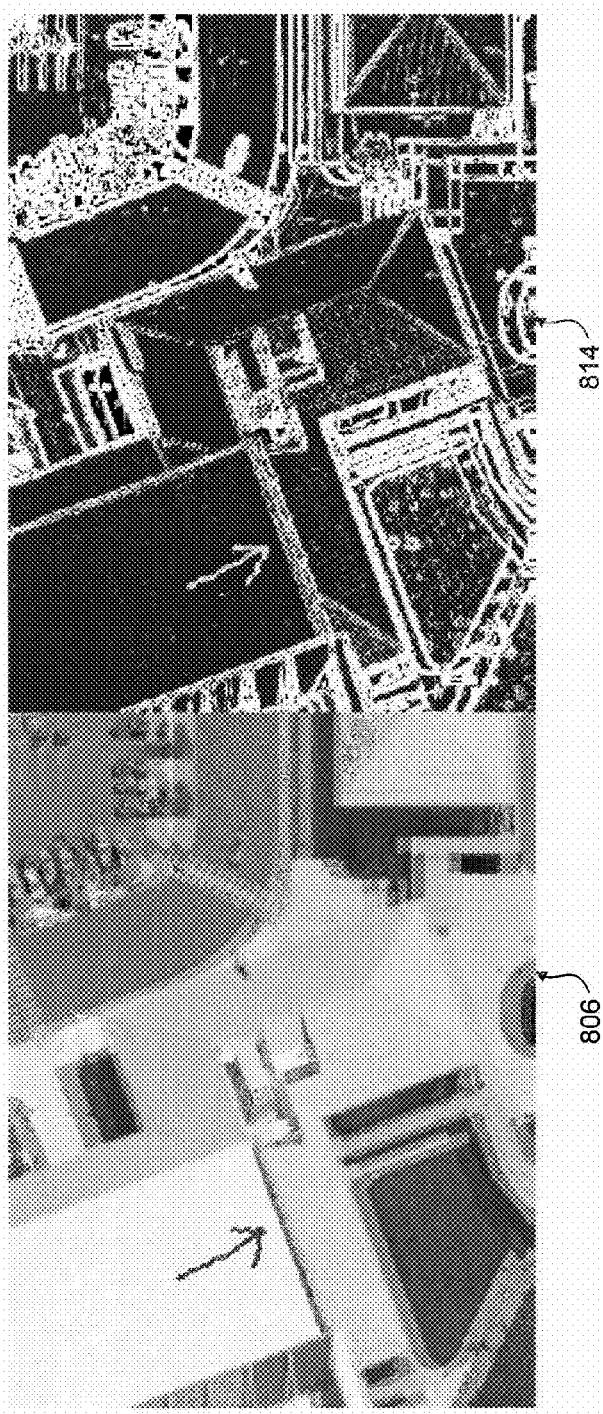

FIGS. 8A-8C illustrate example projections of images 702 and 704 to horizontal slices of a slanted voxel grid. Images illustrated on the left, i.e., 802, 804 and 806, illustrate an average of images 702 and 704. Images illustrated on the right, i.e., 810, 812 and 814, illustrate a photo-consistency error between images 702 and 704.

FIGS. 8A-8C illustrate horizontal slices through three heights: at ground level, at a lower roof, and at a higher roof. Pixels representing voxels of a horizontal slice that are at a correct height will be in-focus (i.e., not blurred) in images 802, 804 and 806, and will have a lower photo-consistency error (i.e., appear darker) in images 810, 812 and 814.

Referring to FIG. 8A, at ground level, features on the ground are in focus. For example, consider the shadow pointed to by the arrow of images 802 and 810 in FIG. 8A.

At the height illustrated by FIG. 8B, the bottom of the roof pointed to by the arrow of images 804 and 812 is in focus.

At the height illustrated by FIG. 8C, the (higher) roof pointed to by the arrow of images 806 and 814 is in focus.

FIGS. 9A-9D illustrate screenshots of the surfaces computed from the images of FIGS. 8A-8C, according to an embodiment. FIGS. 9A-9D are example screenshots of a rendering of a wireframe mesh of a computed surface.

Figure 9A:
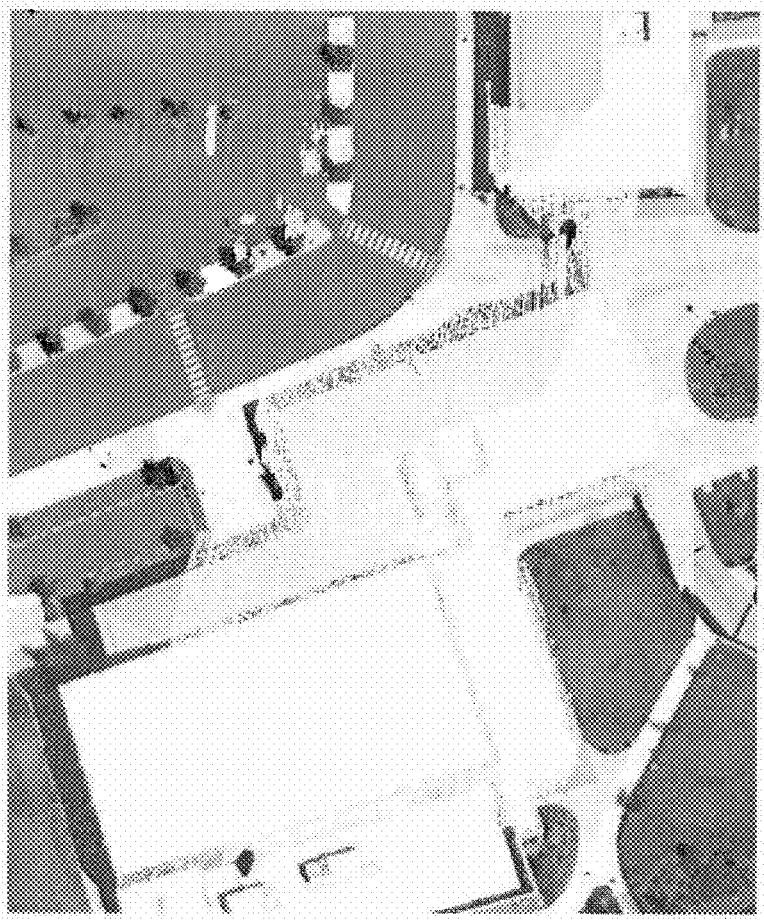
FIGS. 9A-9E illustrate screenshots and wireframes of computed surfaces, according to an embodiment.
Figure 9B:
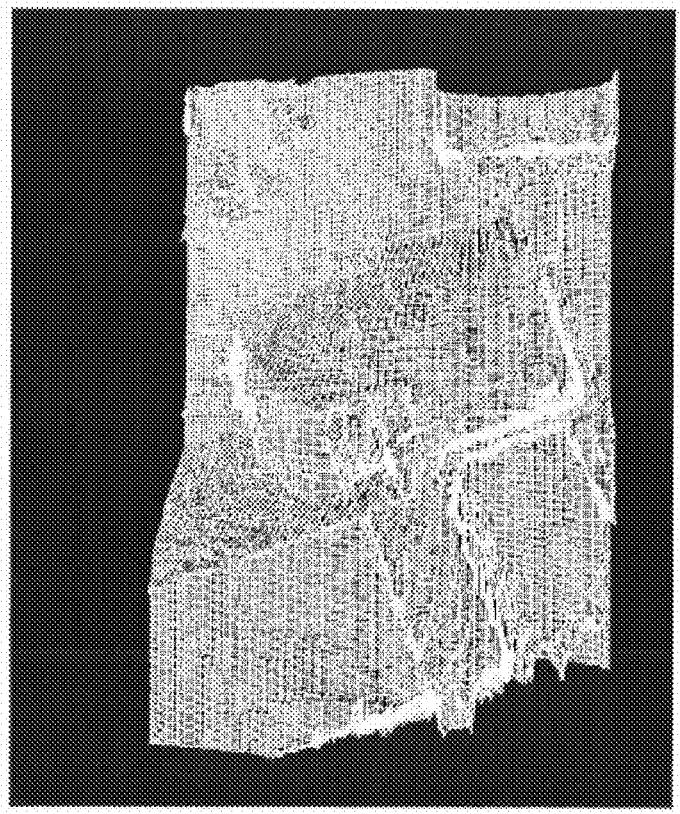
Figure 9C:
Figure 9D:
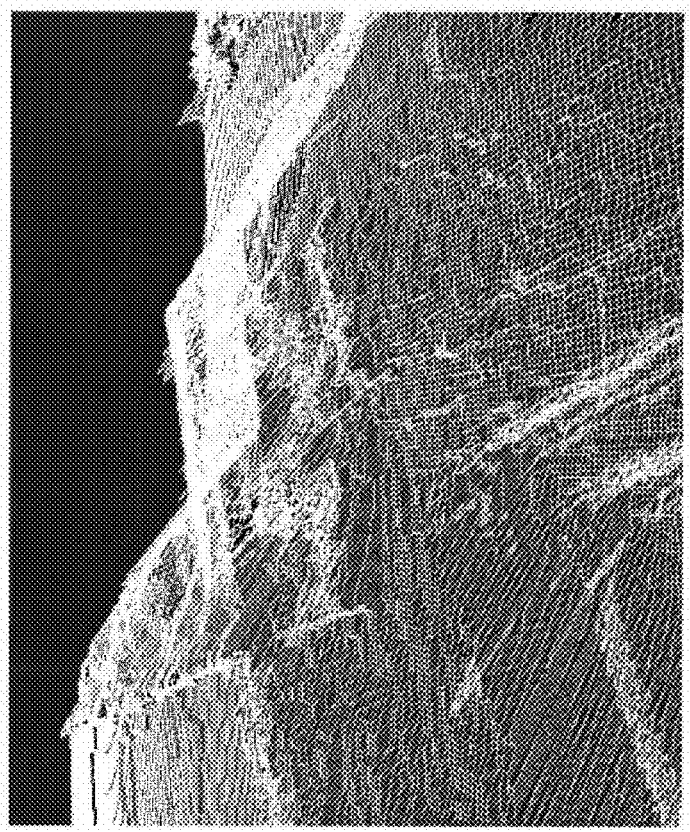
Figure 9E:
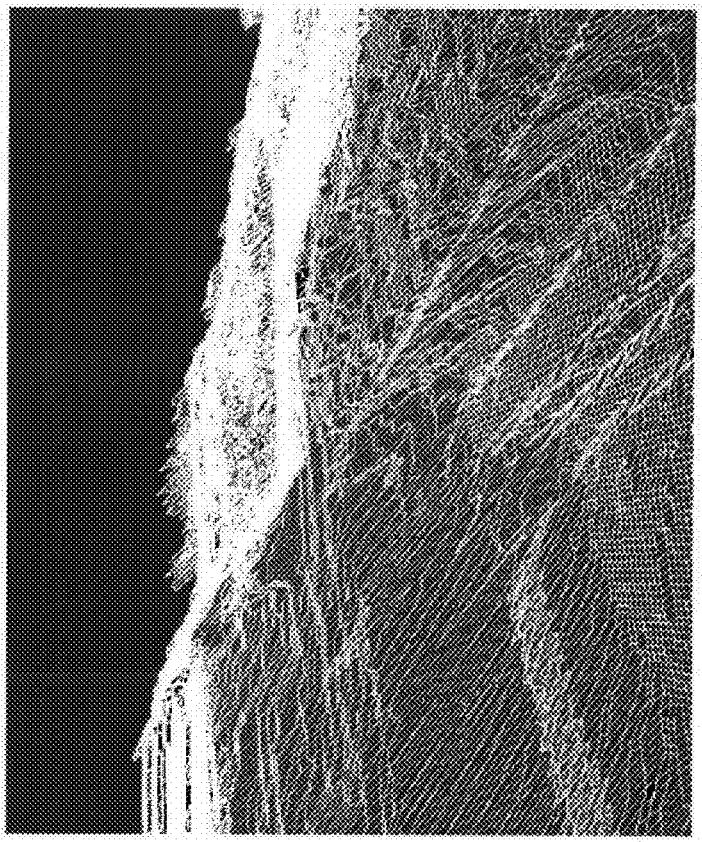

FIG. 9A illustrates computed surface 904, with imagery illustrated under surface 904 for contextual purposes. As an illustrative example, the underlying image of FIG. 9A and computed surface 904 may be displayed in a 3D terrain viewing application. Although computed surface 904 is illustrated as a wireframe, it is to be appreciated that when displayed, surface 904 may be appropriately textured in accordance with surrounding and underlying imagery. FIGS. 9B-9E illustrate surface 904 of FIG. 9A at successively, increasing zoom levels.

Figure 10:
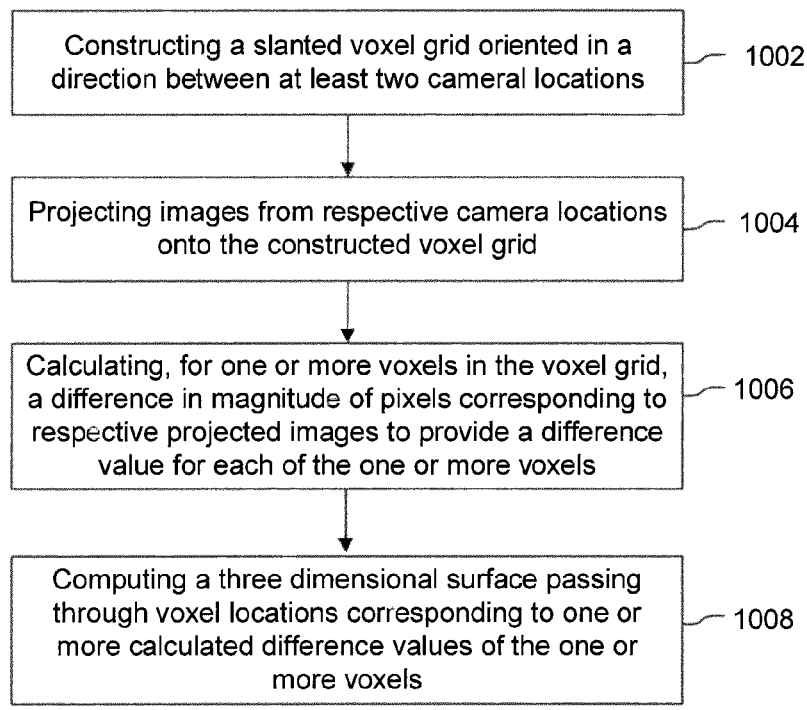
FIG. 10 is a flowchart illustrating an exemplary overall operation for computing a 3D surface, according to an embodiment.

FIG. 10 is a flowchart illustrating an exemplary overall operation for computing a 3D surface, according to an embodiment.

Method 1000 begins with constructing a slanted voxel grid oriented in a direction between at least two camera locations (stage 1002). Method 1000 proceeds by projecting images from respective camera locations onto the constructed voxel grid (stage 1004). For one or more voxels in the voxel grid, a magnitude of difference between pixels corresponding to respective projected images are calculated to provide a difference value for each of the one or more voxels (stage 1006). Embodiments compute a three dimensional surface passing through voxel locations corresponding to one or more calculated difference values of the one or more voxels (step 1008).

In this way, by using a slanted voxel grid for projection of imagery, embodiments accurately reconstruct smooth 3D surfaces representing structures (e.g., buildings) from oblique (or slanted) aerial imagery, i.e., imagery that is captured from a viewpoint that not only points downwards but is also inclined to a side.

Figure 11:
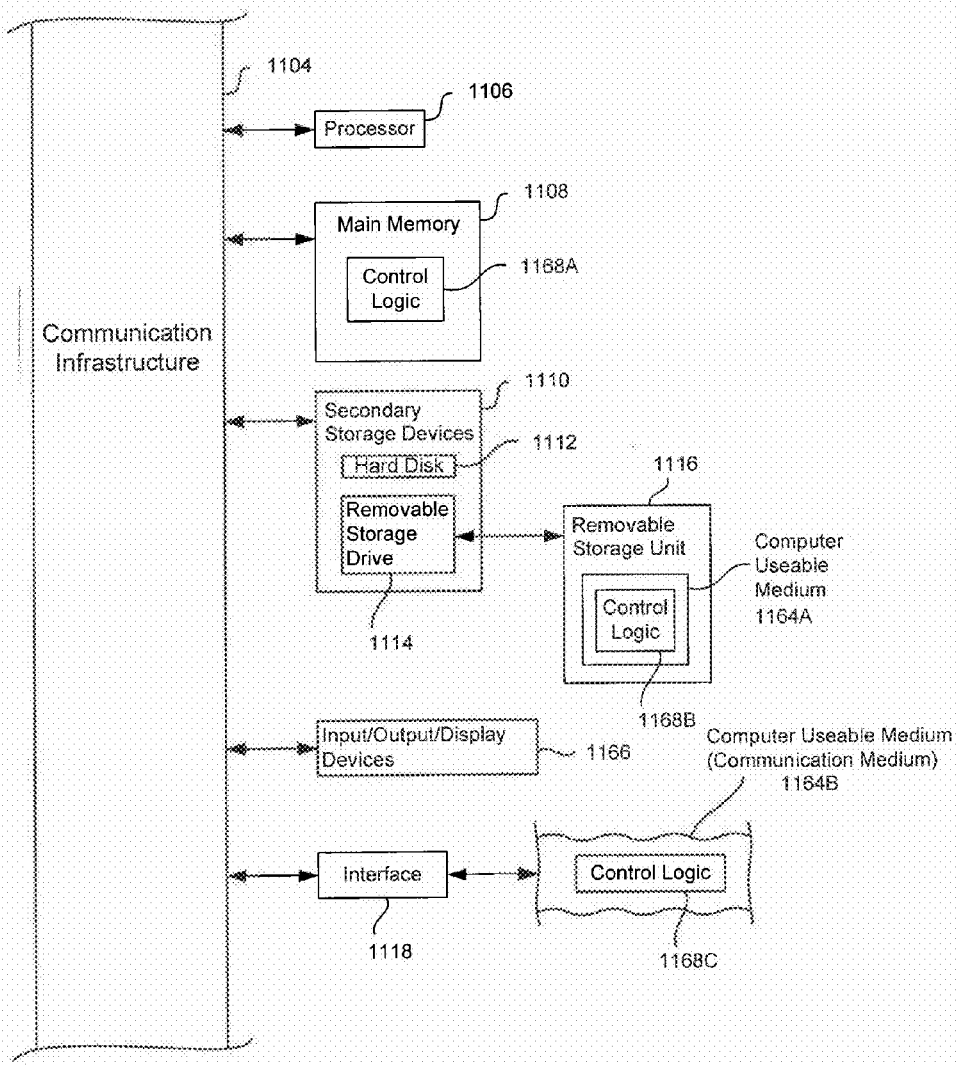
FIG. 11 illustrates an example computer useful for implementing components of embodiments.

In an embodiment, the system and components of embodiments described herein are implemented using well known computers, such as example computer 1102 shown in FIG. 11. For example, voxel grid constructor 120, image projector 130 and surface computer 140 can be implemented using computer(s) 1102.

Computer 1102 can be any commercially available and well known computer capable of performing the functions described herein, such as computers available from International Business Machines, Apple, Sun, HP, Dell, Compaq, Cray, etc.

Computer 1102 includes one or more processors (also called central processing units, or CPUs), such as a processor 1106. Processor 1106 is connected to a communication infrastructure 1104.

Computer 1102 also includes a main or primary memory 1108, such as random access memory (RAM). Primary memory 1108 has stored therein control logic 1168A (computer software), and data.

Computer 1102 also includes one or more secondary storage devices 1110. Secondary storage devices 1110 include, for example, a hard disk drive 1112 and/or a removable storage device or drive 1114, as well as other types of storage devices, such as memory cards and memory sticks. Removable storage drive 1114 represents a floppy disk drive, a magnetic tape drive, a compact disk drive, an optical storage device, tape backup, etc.

Removable storage drive 1114 interacts with a removable storage unit 1116. Removable storage unit 1116 includes a computer useable or readable storage medium 1164A having stored therein computer software 1168B (control logic) and/or data. Removable storage unit 1116 represents a floppy disk, magnetic tape, compact disk, DVD, optical storage disk, or any other computer data storage device. Removable storage drive 1114 reads from and/or writes to removable storage unit 1116 in a well known manner.

Computer 1102 also includes input/output/display devices 1166, such as monitors, keyboards, pointing devices, Bluetooth devices, etc.

Computer 1102 further includes a communication or network interface 1118. Network interface 1118 enables computer 1102 to communicate with remote devices. For example, network interface 1118 allows computer 1102 to communicate over communication networks or mediums 1164B (representing a form of a computer useable or readable medium), such as LANs, WANs, the Internet, etc. Network interface 1118 may interface with remote sites or networks via wired or wireless connections.

Control logic 1168C may be transmitted to and from computer 1102 via communication medium 1164B.

Any tangible apparatus or article of manufacture comprising a computer useable or readable medium having control logic (software) stored therein is referred to herein as a computer program product or program storage device. This includes, but is not limited to, computer 1102, main memory 1108, secondary storage devices 1110 and removable storage unit 1116. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method, comprising:
   constructing, by one or more computing device, a slanted voxel grid oriented in a direction between at least two camera locations;
   projecting, by the one or more computing devices, images from respective camera locations onto the constructed voxel grid;
   calculating, by the one or more computing devices, for one or more voxels in the voxel grid, a photo-consistency error between the projected images at a center of each of the one or more voxels, the photo-consistency error being calculated as a magnitude of a gradient difference of the projected images at the center of each respective voxel of the one or more voxels; and
   computing, by the one or more computing devices, a three dimensional surface passing through voxel locations corresponding to one or more calculated gradient difference values of the one or more voxels, wherein the voxel locations are located at the center of each respective voxel of the one or more voxels.

2. The method of claim 1, wherein the
   voxel locations correspond to calculated gradient difference values having lower magnitudes with respect to other calculated gradient difference values.

3. The method of claim 2, wherein the computing comprises:
   computing the three dimensional surface using a min-cut algorithm, the min-cut algorithm configured to approximate a smooth surface passing through the voxel locations.

4. The method of claim 1, wherein the center of each of the one or more voxels corresponds to a three dimensional world position.

5. The method of claim 1, wherein the projecting comprises:
   projecting a plurality of aerial images onto the constructed voxel grid.

6. The method of claim 1, wherein the computed three dimensional surface represents a height-map relative to the voxel grid.

7. The method of claim 1, further comprising determining a smoothness error based on the calculated gradient difference values.

8. The method of claim 7, wherein computing the three-dimensional surface comprises computing the three-dimensional surface in a manner that minimizes the summation of the photo-consistency error and the smoothness error.

9. A computer-based system, comprising:
one or more processors;
a voxel grid constructor configured to construct a slanted voxel grid oriented in a direction between at least two camera locations;
an image projector configured to project images from respective camera locations onto the constructed voxel grid;
a surface computer configured to calculate, for one or more voxels in the voxel grid, a photo-consistency error between the projected images at a center of each of the one or more voxels, the photo-consistency error being calculated as a magnitude of a gradient difference of the projected images at the center of each respective voxel of the one or more voxels, the surface computer being further configured to compute a three dimensional surface passing through voxel locations corresponding to one or more calculated gradient difference values of the one or more voxels, wherein the voxel locations are located at the center of each respective voxel of the one ore more voxels,
wherein the voxel grid constructor, the image projector and the surface computer are implemented using the one or more processors.

10. The system of claim 9, wherein the voxel locations correspond to calculated gradient difference values having lower magnitudes with respect to other calculated gradient difference values.

11. The system of claim 9, wherein the surface computer is configured to compute the three dimensional surface using a min-cut algorithm, the min-cut algorithm configured to approximate a smooth surface passing through the voxel locations.

12. The system of claim 9, wherein the surface computer is further configured to determine a smoothness error based on the calculated gradient difference values.

13. The system of claim 12, wherein the three-dimensional surface is computed in a manner that minimizes the summation of the photo-consistency error and the smoothness error.

14. A computer storage apparatus encoded with a computer program, the program comprising instructions that when executed by data processing apparatus cause the data processing apparatus to perform operations, comprising:
constructing a slanted voxel grid oriented in a direction between at least two camera locations;
projecting images from respective camera locations onto the constructed voxel grid;
calculating, for one or more voxels in the voxel grid, a photo-consistency error between the projected imaged at a center of each of the one or more voxels, the photo-consistency error being calculated as a magnitude of a gradient difference of the projected images at the center of each respective voxel of the one or more voxels; and
computing a three dimensional surface passing through voxel locations corresponding to one or more calculated gradient difference values of the one or more voxels, wherein the voxel locations are located at the center of each respective voxel of the one or more voxels,
wherein the voxel locations correspond to calculated gradient difference values having lower magnitudes with respect to other calculated gradient difference values.

15. The computer storage apparatus of claim 14, the computing comprising:
computing the three dimensional surface using a min-cut algorithm, the min-cut algorithm configured to approximate a smooth surface passing through the voxel locations.

16. The computer storage apparatus of claim 14, wherein the center of each of the one or more voxels corresponds to a three dimensional world position.

17. The computer storage apparatus of claim 14, the projecting comprising: projecting a plurality of aerial images onto the constructed voxel grid.

18. The computer storage apparatus of claim 14, wherein the computed three dimensional surface represents a heightmap relative to the voxel grid.

19. The computer storage apparatus of claim 14, further comprising determining a smoothness error based on the calculated gradient difference values.

20. The computer storage apparatus of claim 19, wherein computing the three-dimensional surface comprises computing the three-dimensional surface in a manner that minimizes the summation of the photo-consistency error and the smoothness error.

* * * * *